(12) United States Patent
Sahota

(10) Patent No.: US 6,819,938 B2
(45) Date of Patent: Nov. 16, 2004

(54) SYSTEM AND METHOD FOR POWER CONTROL CALIBRATION AND A WIRELESS COMMUNICATION DEVICE

(75) Inventor: Gurkanwal Singh Sahota, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 176 days.

(21) Appl. No.: 10/177,057

(22) Filed: Jun. 20, 2002

(65) Prior Publication Data

US 2003/0002452 A1 Jan. 2, 2003

Related U.S. Application Data

(60) Provisional application No. 60/301,184, filed on Jun. 26, 2001.

(51) Int. Cl.[7] ................................................. H04B 7/00
(52) U.S. Cl. .................. 455/522; 455/127.1; 455/127.2
(58) Field of Search .......................... 455/127.1, 127.2, 455/91, 575.1, 550.1, 115.1, 115.2–4, 116, 123, 126, 127.3, 69, 67.11, 136, 234.1, 234.2, 522, 245.1, 118, 561; 370/318, 342, 252; 375/295, 205, 297, 302, 345, 298; 330/129, 278, 290, 291, 292, 279, 229, 140, 284, 259, 149, 144; 332/103; 342/165–174, 195

(56) References Cited

U.S. PATENT DOCUMENTS

| | | | | |
|---|---|---|---|---|
| 5,129,098 A | * | 7/1992 | McGirr et al. ................ 455/69 |
| 5,548,616 A | * | 8/1996 | Mucke et al. ............... 375/295 |
| 5,590,408 A | | 12/1996 | Weiland et al. ............... 455/69 |
| 5,732,334 A | | 3/1998 | Miyake ....................... 455/126 |
| 5,745,006 A | * | 4/1998 | Budnik et al. ............... 330/149 |
| 6,018,650 A | * | 1/2000 | Petsko et al. ............. 455/234.1 |
| 6,275,684 B1 | * | 8/2001 | Kaneko et al. .............. 455/118 |
| 6,311,044 B1 | * | 10/2001 | Wilde et al. ................... 455/73 |
| 6,370,203 B1 | * | 4/2002 | Boesch et al. ............... 375/297 |
| 2002/0037705 A1 | * | 3/2002 | Moerder et al. ............. 455/115 |

FOREIGN PATENT DOCUMENTS

| | | | | |
|---|---|---|---|---|
| WO | WO 95/08878 A1 | * | 3/1995 | ........... H04B/7/005 |
| WO | 9508878 | | 3/1995 | ........... H04B/7/005 |
| WO | 0033491 | | 6/2000 | ........... H04B/17/00 |
| WO | WO 00/33491 A1 | * | 6/2000 | ........... H04B/17/00 |

* cited by examiner

Primary Examiner—Quochien B. Vuong
Assistant Examiner—C. Chow
(74) Attorney, Agent, or Firm—Philip Wadsworth; Charles Brown; Donald Kordich

(57) ABSTRACT

A technique for calibrating the open-loop transmit power of a wireless communication device overcomes the inherent nonlinearities in the gain control input of a variable gain amplifier (VGA). In one embodiment, a feedback circuit generates a signal indicative of the transmit power. This signal is compared with a desired transmit power level, which comprises an open-loop gain component and a closed-loop gain component. The desired transmit power level is compared with the actual transmit power level and an error signal is generated. The error signal is used to alter the gain of the VGA in the transmitter to thereby adjust the actual transmit power level to correspond with the desired transmit power level. In alternative embodiment, the receiver portion, which also contains a VGA, is pre-calibrated in a conventional manner. During a transmitter calibration process, the transmitter is coupled to the receiver input through a mixer and filter. The pre-calibrated receiver determines the actual transmit power level. The difference is used to generate error correction data to adjust for non linearities in the gain control input of the transmitter VGA.

3 Claims, 7 Drawing Sheets

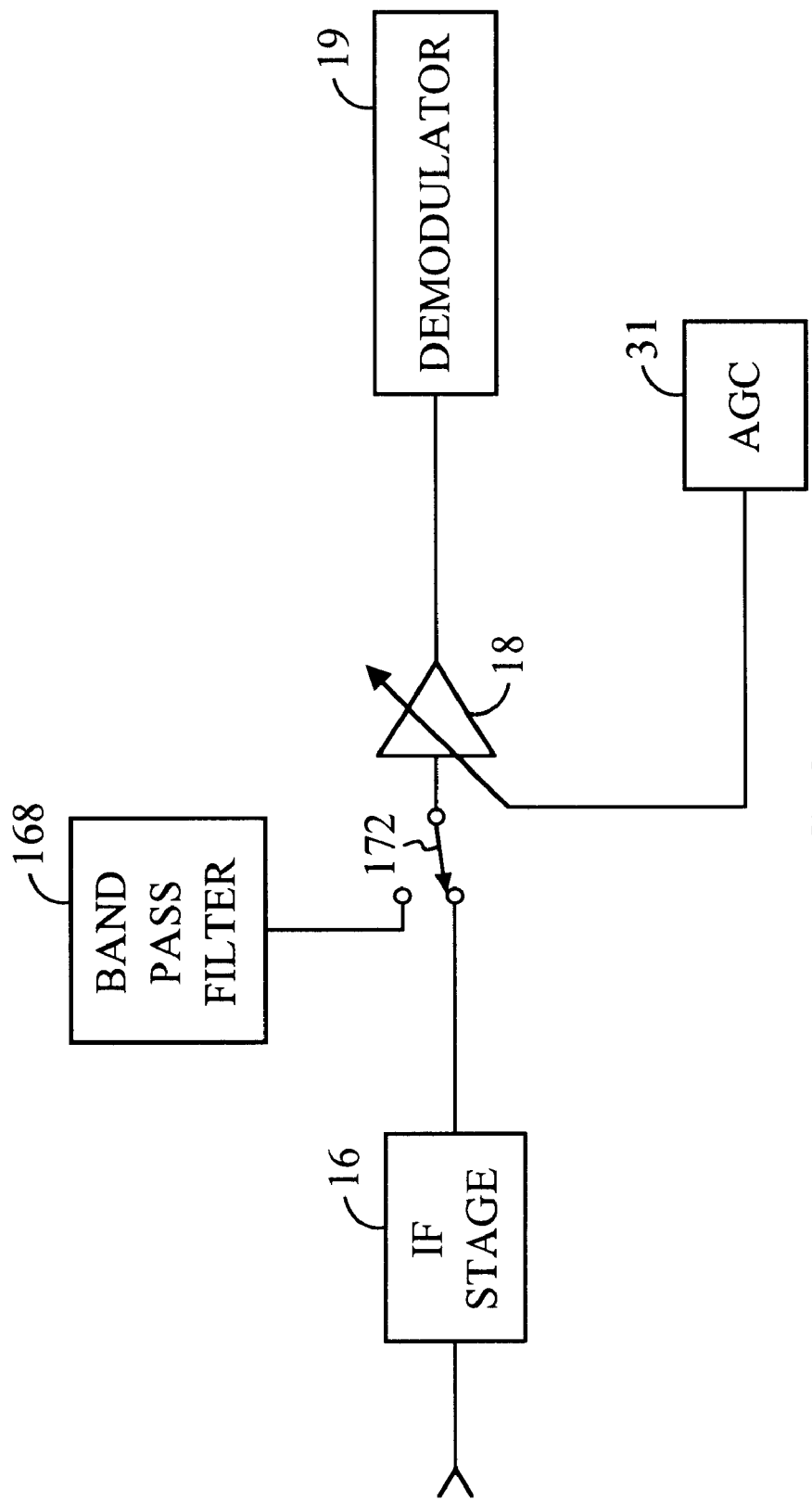

SYSTEM AND METHOD FOR POWER CONTROL CALIBRATION AND A WIRELESS COMMUNICATION DEVICE

RELATED APPLICATIONS

This applications claims priority to U.S. Provisional Application No. 60/301,184, filed on Jun. 26, 2001.

FIELD OF THE INVENTION

The disclosed subject matter is directed generally to power control in a wireless communication device and, more particularly, to a system and method for calibration of open-loop power control in a wireless communication device.

BACKGROUND OF THE INVENTION

Wireless communication devices are widely used throughout the world. Such wireless devices use radio frequency components, including transmitters and receivers. Proper operation of wireless devices requires the careful calibration of the transmitter and receiver sections. This is particularly important in some wireless communications schemes, such as code division multiple access (CDMA) technology where multiple users are transmitting simultaneously on the same frequency.

As is known in the art, CDMA technology assigns different pseudo noise (PN) codes to each wireless device. The PN codes are mathematically uncorrelated to each other such that one CDMA wireless device cannot decode the radio frequency (RF) signal intended for another CDMA device. As a result, a signal transmitted from one CDMA wireless device appears as noise to other CDMA devices operating at the same frequency and in the same geographic region. Thus, it is desirable to minimize transmitted power for each CDMA device in order to reduce the noise effects on other CDMA devices. Therefore, proper calibration of each CDMA device is important for satisfactory operation of the overall CDMA system.

A simplified block diagram of the receiver portion of a CDMA device is illustrated in the function block diagram of FIG. 1. The operation of the wireless device 10 illustrated in the functional block diagram of FIG. 1 is known to those of ordinary skill in the art and thus need not be described in great detail herein. Radio signals are detected by an antenna 12 and coupled to an RF stage 14. The RF stage 14 may include a number of different components, such as amplifiers, tuning circuitry, filters, and the like. For the sake of brevity, those various components are illustrated in FIG. 1 as the RF stage 14. The output of the RF stage 14 is coupled to an intermediate frequency (IF) stage 16. The RF stage 14 and IF stage 16 amplify the signal detected by the antenna 12 and shift the frequency from RF frequencies down to an intermediate frequency.

A variable gain amplifier (VGA) 18 receives the signal from the IF stage 16 and amplifies the signal to a desired level. As will be described in greater detail below, the variable gain amplifier has a variable gain input $V_{CONT}$ which sets the level of amplification. Although the VGA 18 is illustrated as a single component, a typical implementation often uses multiple stages of amplification to provide the necessary gain. However, these are engineering implementations within the skill of the design engineer. For the sake of simplicity, the multiple gain stages are illustrated in FIG. 1 as the VGA 18.

The output of the VGA 18 is coupled to a demodulator 19. The demodulator 19 comprises quadrature mixers 20 and 22. The quadrature mixer 20 is mixed with a local oscillator ILO while the quadrature mixer 22 is mixed with the local oscillator QLO. The output of the quadrature mixers 20 and 22 are taken for further processing in a conventional manner to produce the voice signal. However, the presently disclosed subject matter is directed to control of amplifiers and is not directly related to the actual processing of the received signals to produce the audio data.

The output of the quadrature mixers 20 and 22 are also coupled to low-pass filters 24 and 26, respectively, and subsequently coupled to inputs of respective analog-to-digital converters (ADC) 28 and 30. To efficiently utilize the dynamic range of the ADCs 28 and 30, the device 10 is designed to control the gain of the VGA 18 so as to produce a fixed power level at the inputs of the ADCs 28 and 30.

The outputs of the ADCs 28 and 30 are provided to an automatic gain control (AGC) loop 31 that ultimately will control the gain of the VGA 18. The outputs of the ADCs 28 and 30 are combined in a summing circuit 32 and provided to a log circuit 34. The log circuit 34 converts the signal from a linear form to a logarithmic form to thereby permit control of the VGA 18 in decibels (dB). The output of the log circuit 34 is combined with a control voltage $P_{REF}$ in an adder 36. The control voltage $P_{REF}$ is a control setpoint for the AGC loop 31.

The output of the adder 36 is integrated by an integrator 38 and provided as an input to a linearizer 40. The integrator 38 averages the control signal from the adder 36 and controls the response time of the AGC loop 31 through the selection of an integration time. It is also possible to control the bandwitdth of the AGC loop 31 by varying the gain of the integrator 38. An increase of the gain of the integrator 38 causes a corresponding increase in the bandwidth of the AGC loop 31. So long as the VGA 18 is properly linearized, the output of the integrator 38 is a linear function of the power-in ($P_{IN}$) detected by the RF stage 14 and IF stage 16. The output of the integrator 38 is also an indication of the strength of the received signal. The signal is generally described in the wireless communication industry as a received signal strength indicator (RSSI).

Although the RSSI is an indicator of received signal strength, the signal itself cannot be used directly to control the gain of the VGA 18 because of the inherent nonlinearities of the variable gain input. As will be discussed in greater detail below, the linearizer 40 compensates for non-linearities in the control voltage versus gain characteristics of the VGA 18. The output of the linearizer 40 is provided to a digital-to-analog circuit (DAC) 42. The output of the DAC 42 is the control voltage $V_{CONT}$ that controls the gain of the VGA 18.

As noted above, it is desirable to produce fixed level inputs for the ADCs 28 and 30. The gain of the VGA 18 is controlled by the AGC loop 31 to provide the desired level at the inputs of the ADCs 28 and 30. FIG. 2 illustrates the ideal gain of the VGA 18 versus input power produced by the IF stage 16. FIG. 2 illustrates the ideal linear relationship between gain and power in ($P_{IN}$). In an ideal situation, if $P_{IN}$ decreases, the gain of the VGA 18 increases by the same amount such that the power provided to the ADCs 28 and 30 is constant. Unfortunately, the variable gain input versus gain of the VGA 18 is not linear.

FIG. 3 illustrates the relationship between the control voltage $V_{CONT}$ and the gain of the VGA 18. The ideal curve shows a linear relationship between the control voltage $V_{CONT}$ and the gain. However, process variations and design limitations of the VGA 18 make it virtually impossible to achieve ideal linear relationship. FIG. 3 also illustrates the actual relationship between the control voltage $V_{CONT}$ and gain of the VGA 18. The actual curve has been somewhat exaggerated to illustrated the nonlinearity between the control voltage $V_{CONT}$ and gain. Because of this inherent nonlinearity, it is necessary to utilize the linearizer 40 to compensate for differences between the actual control voltage curve and the ideal voltage curve.

It should be noted that the non-linearity described herein refers to the nonlinear relationship between the voltage control $V_{CONT}$ and the actual gain of the VGA 18. The relationship between the input and output of the VGA 18 is highly linear. That is, the output of the VGA 18 is a highly accurate amplified version of the input. The non-linearity referred to herein is the nonlinear relationship between the voltage control input and the gain setting of the VGA 18.

As noted above, the linearizer 40 is used to compensate for nonlinearities in the gain control of the VGA 18. A number of different known techniques may be used to implement the linearizer 40. One such technique utilizes piece-wise linear segments, also illustrated in FIG. 3, to approximate the actual control voltage $V_{CONT}$ versus gain curve. In this manner, the device 10 selects the linear segment that most closely approximates the desired control voltage. For example, FIG. 3 illustrates a desired gain $G_1$. In the ideal circumstance, a control voltage $V_{CONT1}$ is required to generate that gain using the VGA 18 (see FIG. 1). However, due to the non-linearities in the gain control of the VGA 18, it is necessary to produce the control voltage $V'_{CONT1}$ to achieve the desired gain $G_1$. Using the linearizer 40, the device 10 selects a linear segment 44 that approximates the desired control voltage $V'_{CONT1}$. With the proper selection of a linear line segment that approximates the desired control voltage, it is possible to accurately produce the desired level of gain in the VGA 18.

It should be noted that, for the sake of clarity, FIG. 3 illustrates a relatively few number of line segments, including the segment 44, to approximate the actual control voltage $V_{CONT}$ versus gain. To produce the desired degree of accuracy, it is generally necessary to produce significantly greater number of line segments to approximate the actual control voltage curve. In one example, sixteen separate segments are used to approximate the control voltage curve.

The drawback of this process is that each individual wireless device must be carefully calibrated so that the linearizer 40 is customized for virtually every device. This requires careful calibration of the receiver circuitry using external test equipment and programming of the linearizer 40 to achieve the desired degree of accuracy. Furthermore, the transmitter section of a wireless device, which is not illustrated in FIG. 1, has a similar variable gain amplifier. The control voltage curve of the transmitter variable gain amplifier must also be calibrated so that the transmit power is carefully controlled.

Because of the importance of power control in a CDMA wireless system, the calibration of the variable gain amplifier in the transmitter of a wireless device is even more important and time-consuming than the process described above with respect to the receiver portion of a wireless communication device. Thus, accurate calibration of each wireless device requires a significant number of calibration steps using external test equipment to generate a custom selected linearizer for the transmitter and receiver of each wireless device. As those skilled in the art will recognize, this is a time-consuming process, which is difficult to perform.

Using conventional techniques, each wireless device undergoes a number of calibration steps to assure proper operation of the variable gain amplifiers and linear operation for a wide range of gain settings over temperature and frequency. For a wireless device with multiple gain steps, such as a CDMA wireless device, the receiver portion may require nearly three dozen calibration steps while the transmitter portion of the wireless device may require as many as 117 different calibration steps. These processes include calibration steps for the variable gain amplifiers, including steps to assure linearity over frequency, over voltage variations of the power supply (not shown) and over the expected temperature range of operation.

Those skilled in the art will appreciate that such an enormous number of calibration steps, each of which requires external test equipment, is very time-consuming in the production process and adds significantly to the cost of the product. Therefore, it can be appreciated that there is a significant need for a technique that reduces the number of calibration steps that must be performed for proper operation of a wireless device. The presently disclosed subject matter provides this and other advantages as will be apparent from the following detailed description and accompanying figures.

SUMMARY

The presently disclosed subject matter is embodied in a system and method for the control of transmit power in a wireless communication device. Wireless communication device has a transmitter and a receiver, which may share some circuit components. The system comprises a variable gain transmitter amplifier having an amplifier input and an amplifier output in a variable gain control input. A transmit power processor coupled to the amplifier output detects a transmit power level and generates a feedback signal related thereto. A power control reference circuit generates a power control signal indicative of a desired transmit power and comprises an open-loop gain component and a closed-loop gain component. An error circuit compares the feedback signal and the power control signal to generate an error signal. The error signal is coupled to the variable gain control input to maintain the transmit power level at the desired transmit power level.

In one embodiment, the system further comprises a received signal strength circuit to generate a received signal strength indicator indicative of a received signal strength of a radio signal received by the receiver. The open-loop gain component is based, at least in part, on the received signal strength indicator. The open-loop gain component may further comprise a pre-determined additional power gain wherein the power control signal comprises the received signal strength indicator and the pre-determined additional power gain.

The closed-loop gain component is based on a power control command received by the receiver. In this embodiment, the error signal is based at least in part on the closed-loop gain component controlled by the power control command received by the receiver.

The wireless communication device includes an antenna and the system may further comprise a radio frequency (RF) power amplifier having an RF amplifier input and an RF amplifier output and an RF amplifier gain control. The RF amplifier input is coupled to the variable gain transmitter amplifier output. The RF amplifier output is coupled to the antenna and the RF amplifier gain input is coupled to the error signal. In one embodiment, the RF amplifier gain is controlled in incremental steps. In this embodiment, the system further comprises a transmit power control circuit to generate a step gain control signal, based on the error signal, to control the incremental gain steps of the RF amplifier.

The system may further include log circuits to allow control of the system in decibels. In one embodiment, the transmit power processor comprises a log circuit to generate a feedback signal in decibels. The error signal may also be coupled to the variable gain control input via a log circuit to provide control of the variable gain transmitter amplifier in decibels.

BRIEF DESCRIPTION OF THE DRAWINGS

FIG. 8 is a functional block diagram of an alternative architecture of the embodiment of FIG. 7.

DETAILED DESCRIPTION OF THE PREFERRED EMBODIMENTS

The presently disclosed subject matter is directed to a technique to control the transmit power and overcome the inherent nonlinearities of control voltage of a variable gain amplifier. In one exemplary embodiment, a dynamic feedback loop is provided that permits precise control of transmit power without the need for a linearizer. Although the importance of power control in a CDMA system has been discussed and the examples presented herein are implementations within a CDMA device, virtually all wireless devices utilize variable gain amplifiers and suffer from the effects of nonlinearity in the gain control. The presently disclosed subject matter provides a solution to the problem of nonlinear gain control and is broadly applicable to any wireless device. The presently disclosed subject matter is not limited to CDMA technology.

Figure 4:
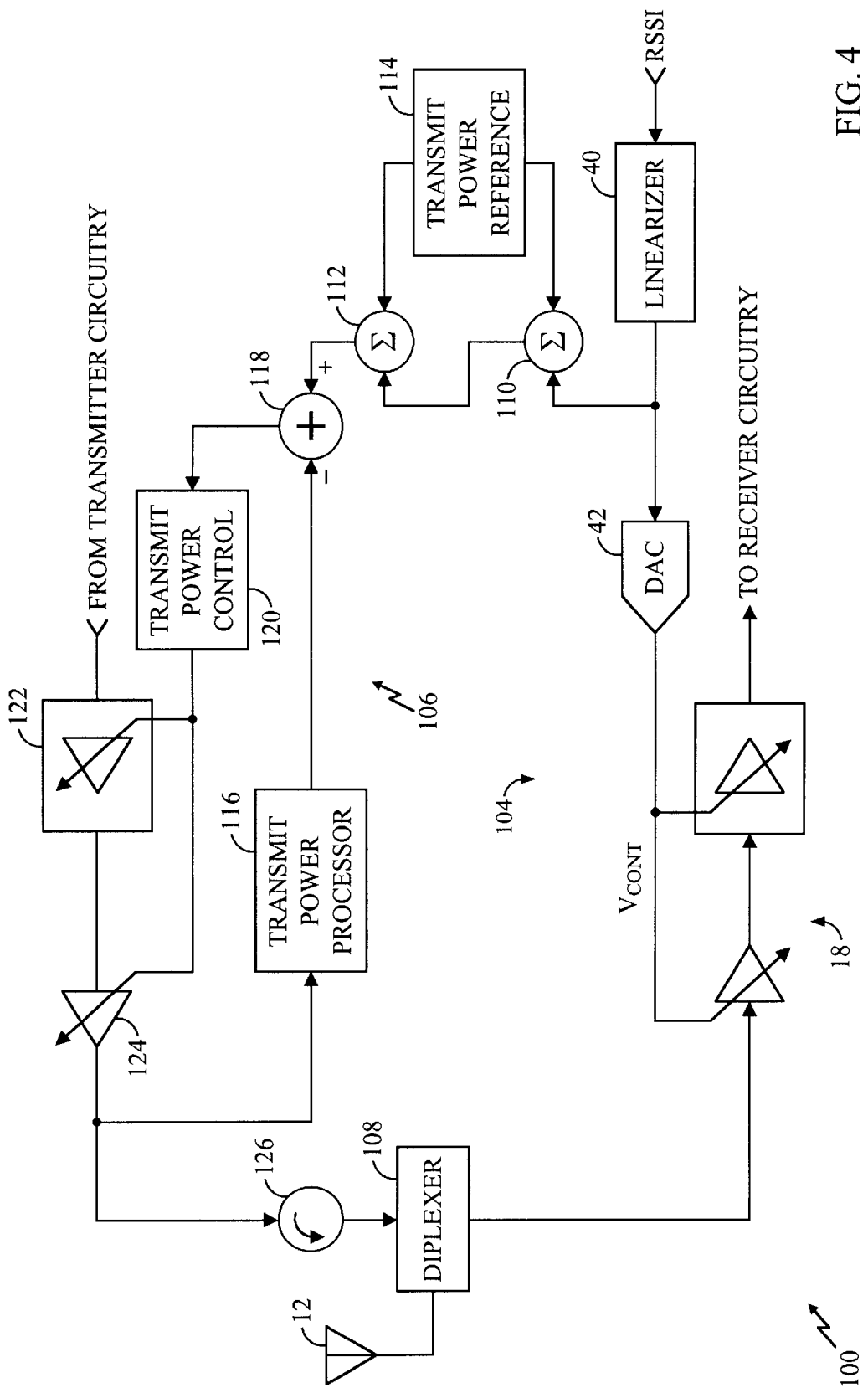
FIG. 4 is a functional block diagram of an implementation of the presently disclosed subject matter to provide automatic linearization of a transmit circuit.

FIG. 4 is a functional block diagram of one exemplary embodiment of the presently disclosed subject matter to control transmit power. In the example illustrated in FIG. 4, the presently disclosed subject matter is embodied in a system 100 that dynamically adjusts the transmit power using a feedback loop. The system 100 includes a receiver portion 104 and a transmitter portion 106. The antenna 12 is coupled to the transmitter portion 104 and the receiver portion 106 through a diplexer 108. The diplexer 108 permits the receiver portion 104 and the transmitter portion 106 to share a common antenna (i.e., the antenna 12). The diplexer 108 is a common device and need not be described in greater detail herein.

Figure 1:
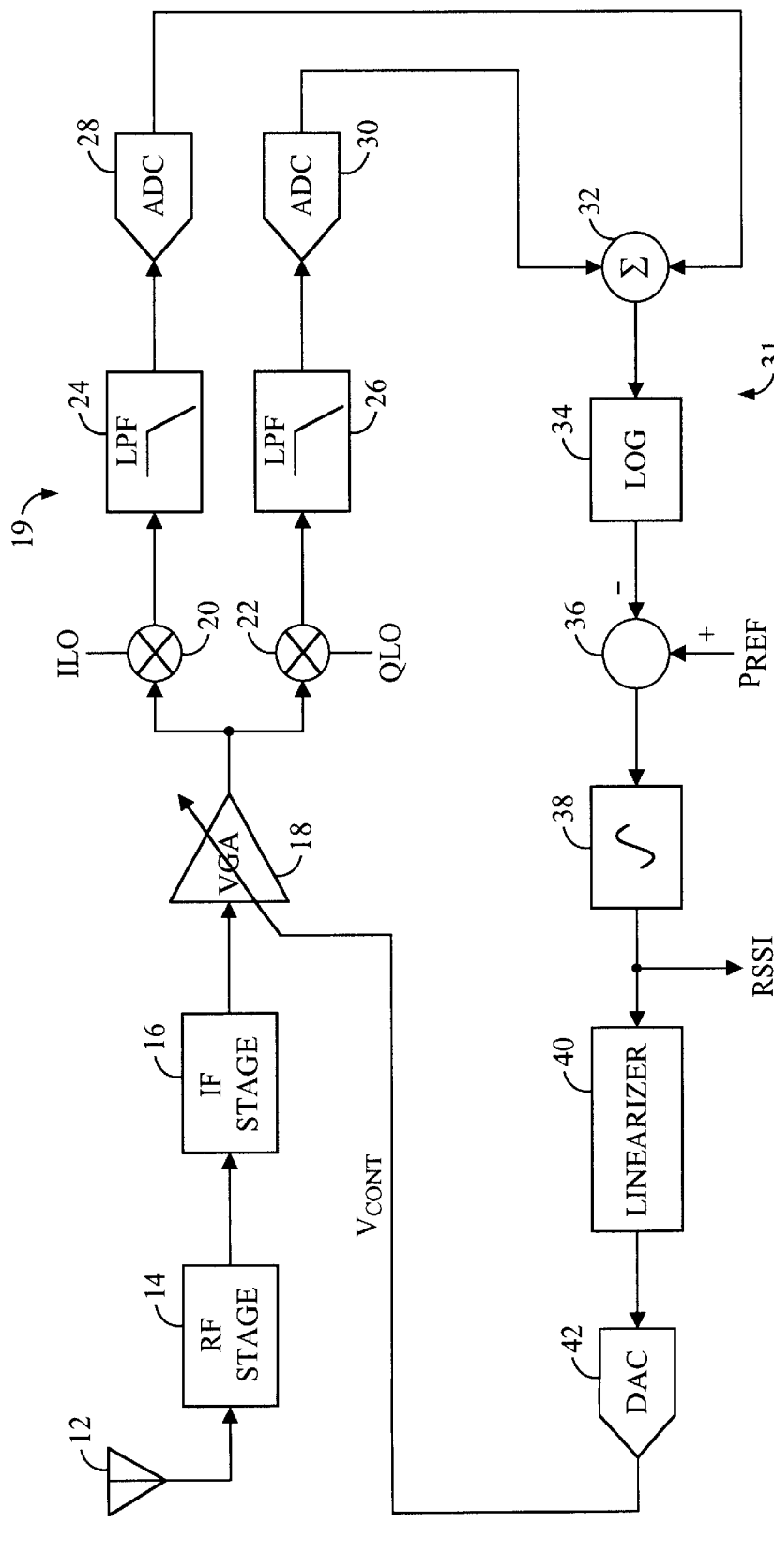
FIG. 1 is a functional block diagram of the receiver portion and automatic gain control loop of a conventional wireless communication device.
Figure 3:
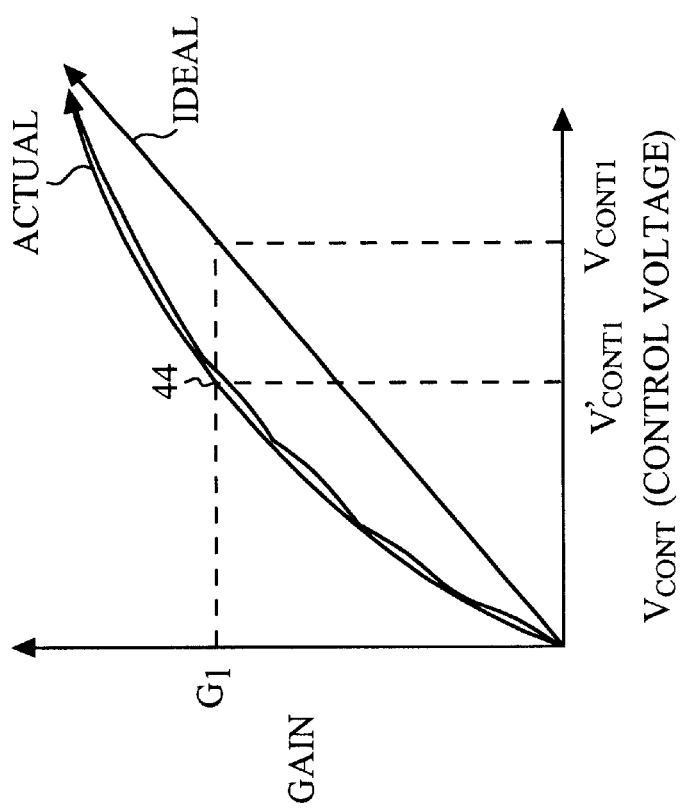
FIG. 3 illustrates variable gain versus gain curves for a typical variable gain amplifier.
Figure 2:
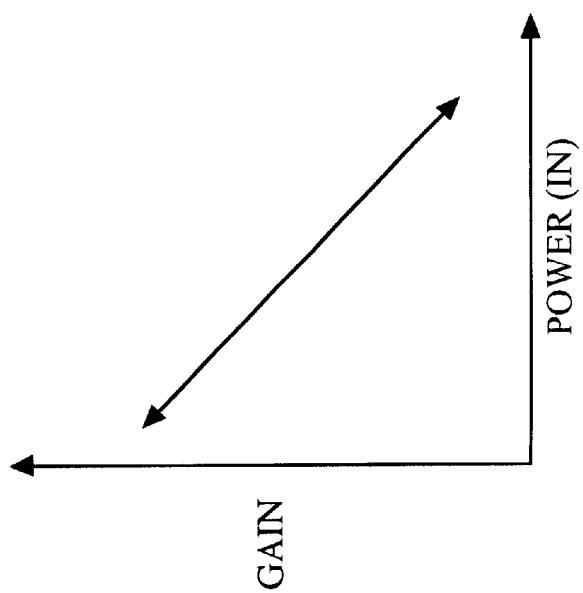
FIG. 2 illustrates the desired gain versus power characteristics of the device of FIG. 1.

The receiver portion 104 includes certain elements that have previously been discussed in the functional block diagram of FIG. 1. However, for the sake of clarity, the receiver portion 104 in FIG. 4 only includes certain elements from FIG. 1. Specifically, the RSSI is provided to the linearizer 40. The output of the linearizer 40 is coupled to the DAC 42 which, in turn, generates the control voltage $V_{CONT}$. The control voltage $V_{CONT}$ controls the gain of the VGA 18.

In addition, the output of the linearizer 40 is provided to the transmitter portion 106. The transmitter portion 106 is implemented using two different gain control factors. The first gain control factor, sometimes referred to as an open-loop gain control simply sets the gain of the transmitter at a predetermined level relative to the received signal level. This factor is sometimes referred to in the industry as a "turn-around constant." Thus, for open-loop power control, the transmit power is the received power plus the turn-around constant.

The turn-around constant is determined by industry standards and can vary based on the particular type of wireless technology. For example, the turn-around constant for cellular telephones is set by industry standard to be +73 dB. That is, the transmit power is set to 73 dB above the power of the received signal. In contrast, personal communication systems (PCS) devices use an industry standard turn-around constant of +78 dB. The presently disclosed subject matter is not limited by the particular level for the turn-around constant.

In addition to the open-loop power control, the system 100 includes a closed-loop power control. While open-loop power control depends only upon the industry standard (i.e., the turn-around constant) and the received signal strength (i.e., RSSI), closed-loop power control is based solely on commands from a base station transceiver system (BTS) (not shown). The BTS sends commands to the mobile unit (i.e., the system 100) to increase or decrease transmit power. In a typical implementation, the BTS sends a command to increase the transmit power when the error rate of data received by the BTS is unacceptably high. Conversely, if the error rate is low, the BTS may send a command to the system 100 to decrease the transmit power. While the turn-around constant described above is a relatively high signal level (e.g., +73 dB), closed-loop power control uses very small incremental steps, such as ¼ dB or ½ dB steps.

FIG. 4 illustrates a transmit power reference 114, which represents both the open-loop power control signal (i.e., the turn-around constant) and the closed-loop power control signals based on commands received from the BTS (not shown). The output of the linearizer 40, which is indicative of the received signal strength, is provided as an input to a summer 110. The transmit power reference 114 provides a signal corresponding to the selected turn-around constant, and may be an AC signal or a DC signal depending on the particular circuit implementation. The output of the summer 110 is a combination of the received signal strength and the turn-around constant. This signal is the open-loop gain component used to set the transmit power. In addition, the transmit power reference 114 responds to signals from the BTS (not shown) to generate closed-loop power control signals. The open-loop power control signals and closed-loop power control signals are combined by a summer 112.

The output of the summer 112 is coupled to the positive input of an adder 118. The negative input of the adder 118 receives a feedback signal from a transmit power processor 116. The operation of the transmit power processor 116 will be described in greater detail below. In essence, the transmit power processor 116 provides negative feedback to the adder 118, which functions as an error circuit. The output of the adder 118 is an error signal that is coupled to a transmit power control circuit 120, which generates control signals for a variable gain amplifier (VGA) 122 and an RF power amplifier 124. The output of the RF power amplifier 124 is coupled to the diplexer 108 through an isolator 126. The isolator 126 maintains a constant impedance for the RF power amplifier 124. In an exemplary embodiment, a 50-ohm impedance is provided by the isolator 126.

The signal input to the VGA 122 comes from transmitter circuitry that, for the sake of clarity, is not illustrated in FIG. 4. The transmitter circuitry, which may typically include a microphone, vocoder, and transmitter modulator, operate in a conventional manner to provide an input signal that will actually be transmitted by the system 100.

The output of the RF power amplifier 124 is also provided as an input to the transmit power processor 116. The transmit power processor 116 generates signals indicative of the actual transmit power and provides that indicator as negative feedback to the transmitter power control circuit 120. In this manner, the transmitter portion 106 includes dynamic power adjustments that are extremely accurate and which eliminates the linearization process required in conventional wireless systems.

In operation, the positive input of the adder 118 is a signal indicating the desired transmit power. As previously noted, this is a combination of the open-loop gain control and closed-loop gain control. The negative input of the adder 118 is a signal indicating the actual transmit power. If the actual transmit power is exactly equal to the desired transmit power, the output of the adder 118 is 0 and no correction in the VGA 122 or RF power amplifier 124 is necessary. If the actual transmit power is higher than the desired transmit power, the output of the adder 118 is a negative signal, indicating that the transmit power should be reduced. In contrast, if the actual transmit power is lower than the desired transmit power, the output of the adder 118 is a positive signal, indicating that an increase in the transmit power is required. Thus, the feedback loop in the transmitter portion 106 accurately controls the actual transmit power in a highly accurate and linear manner.

Figure 5:
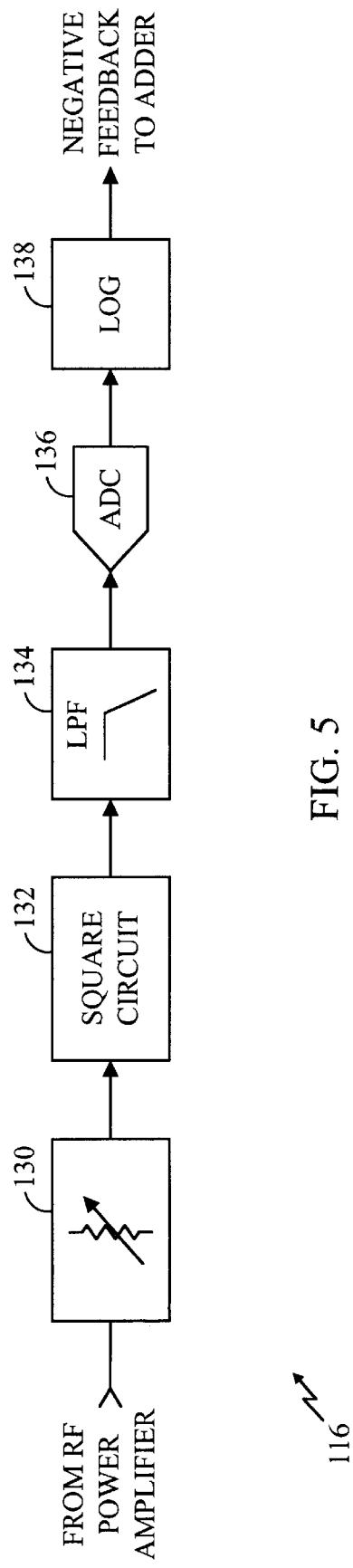
FIG. 5 is a more detailed functional block diagram of a portion of the block diagram of FIG. 4.

Details of the transmit power processor 116 are shown in the functional block diagram of FIG. 5. The transmit power processor 116 includes an attenuator circuit 130, which attenuates the output signal from the RF power amplifier 124 (see FIG. 4). In an exemplary embodiment, the attenuator circuit 130 also presents a high impedance which, when combined in parallel with the isolator 126, provides the necessary constant impedance to the output of the RF power amplifier 124.

The attenuator circuit 130 is coupled to a squaring circuit 132, which generates a signal proportional to the output voltage squared ($V^2$) of the RF power amplifier 124 and thus provides an indication of the actual transmit power. The output of the square circuit 132 is coupled to a low-pass filter 134, which in turn is provided as an input to an ADC 136. The ADC 136 provides digital representation of the transmit power. To convert the transmit power to a logarithmic scale, the output of the ADC 136 is coupled to a log circuit 138.

The output of the log circuit 138 is the negative feedback signal provided to the negative input of the adder 118 (see FIG. 4). Thus, the transmit power processor 116 automatically and dynamically measures the transmitted output power, converts it to digital form and provides a logarithmic representation thereof as a feedback signal in a transmitter control loop.

Figure 6:
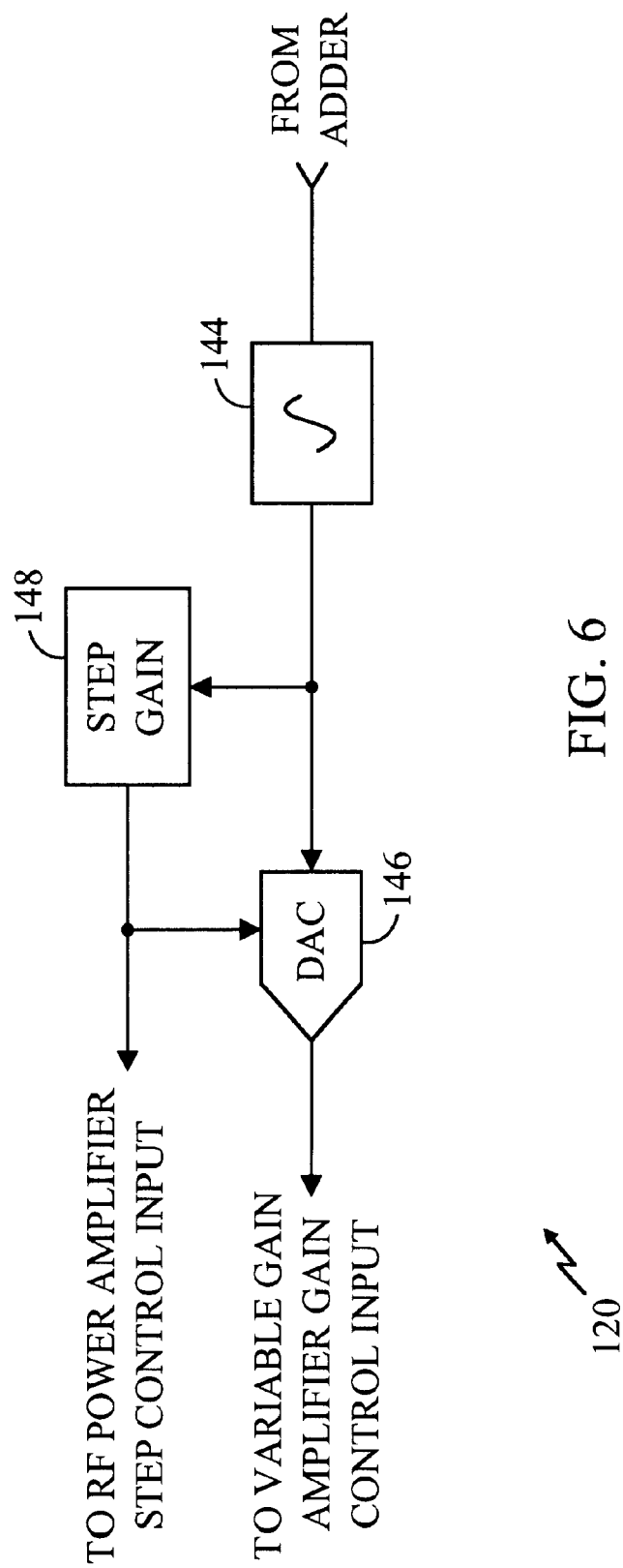
FIG. 6 is a more detailed functional block diagram of a portion of the block diagram of FIG. 4.

Details of the transmit power control circuit 120 are illustrated in the functional block diagram of FIG. 6. The output of the adder 118 (see FIG. 4) is coupled as an input to the transmit power control circuit 120. As discussed above, the signal from the adder 118 includes the desired transmit power signal and the negative feedback signal. The signal from the adder 118, which is essentially an error signal, is provided to an integrator 144. The integrator 144 averages out the error signal and also controls the response time of the feedback loop. As those skilled in the art can appreciate, a longer integration time for the integrator 144 results in slower response time for the feedback loop. The actual selection of the integrator time is a matter of design choice that is within the knowledge of one skilled in the art based on the present disclosure.

The output of the integrator 144 is provided to an input of a DAC 146, which converts the digital signal from the integrator 144 to an analog signal that can be used to control the VGA 122. It should be noted that the functional block diagram of FIG. 4 simplifies the output of the transmit power control circuit 120 by illustrating a single control line to both the VGA 122 and the RF power amplifier 124. However, in the more detailed functional block diagram of FIG. 6, separate control signals are provided for the VGA 122 and the RF power amplifier 124.

It is desirable to maintain as high a signal-to-noise ratio as possible in the VGA 122. A step gain control 148 is used to provide control of large step gains for the RF power amplifier 124 and thereby maintain a high signal-to-noise ratio in the VGA 122. For example, the step gain control 148 may permit the RF power amplifier 124 to have a gain of 0 dBm or +20 dBm. In this example, if the desired transmit power is relatively low, the step gain control 148 may set the gain of the RF power amplifier 124 to 0 dBm and permit the overall gain of the transmitter portion 106 (see FIG. 4) to be controlled by the output of the DAC 146.

If the desired transmit power approaches the maximum limit of the DAC 146, the step gain control 148 may increase the transmit power of the RF power amplifier 124 to, by way of example, +20 dBm. The output of the DAC 146 is adjusted correspondingly to provide any additional gain that is required beyond the gain of the power amplifier 124.

A number of different circuit configurations may be used to provide the necessary amplification in the transmitter portion 106. For example, as previously noted with respect to the VGA 18, the VGA 122 may be implemented as a series of amplifier gain stages that are coupled in series and controlled by the signal generated by the transmit power control circuit 120. Alternatively, the two stages of amplification illustrated in FIG. 4 and controlled by the DAC 146 and step gain control 148, respectively, may be combined into a single amplification stage. Furthermore, the step gain control 148 may use a different step size or a different number of gain steps. The actual step size may be based on the dynamic range of the DAC 146. The presently disclosed subject matter is not limited by the specific architecture of the variable gain amplifier 122, RF power amplifier 124, and the specific control signals associated therewith.

Thus, the circuit of FIG. 4 provides a dynamic feedback loop that completely eliminates the need for linearization in the transmitter of a wireless device. This approach eliminates a large number of calibration steps that must be performed on each wireless device during the manufacturing process. The system 100 greatly increases productivity of the manufacturing process and may reduce the overall costs of the wireless device since costly and time-consuming calibration steps have been eliminated.

The exemplary embodiment illustrated in FIG. 4 eliminates the need for linearization of the transmitter portion 106. However, the inherent nonlinearity between the control voltage $V_{CONT}$ and the actual gain of the VGA 18 (see FIG. 1) in the receiver still requires the linearization process described above.

In another embodiment, the transmitter portion 106 has a linearizer, but utilizes the calibrated receiver portion 104 to eliminate the need for external test equipment that would otherwise be required for calibration of the transmitter portion of the wireless device. In essence, the un-calibrated output of the transmitter portion 106 is coupled to the calibrated receiver portion 104 so that the receiver portion can be used to accurately measure the actual transmitted power levels and allow linearization of the transmitter portion. This embodiment is illustrated in the functional block diagram of FIG. 7. For the sake of clarity, of the functional block diagram of FIG. 7 does not provide details of circuit components that are not relevant to the particular embodiment. Specifically, the demodulator 19 of FIG. 1 includes components, such as mixers 20 and 22, low-pass filters 24 and 26, and the like. For the sake of clarity, those components are illustrated in the functional block diagram of FIG. 7 as the demodulator 19. Similarly, the AGC 31, which comprises a number of components illustrated in FIG. 1, are merely shown in block diagram form as the AGC 31.

Figure 7:
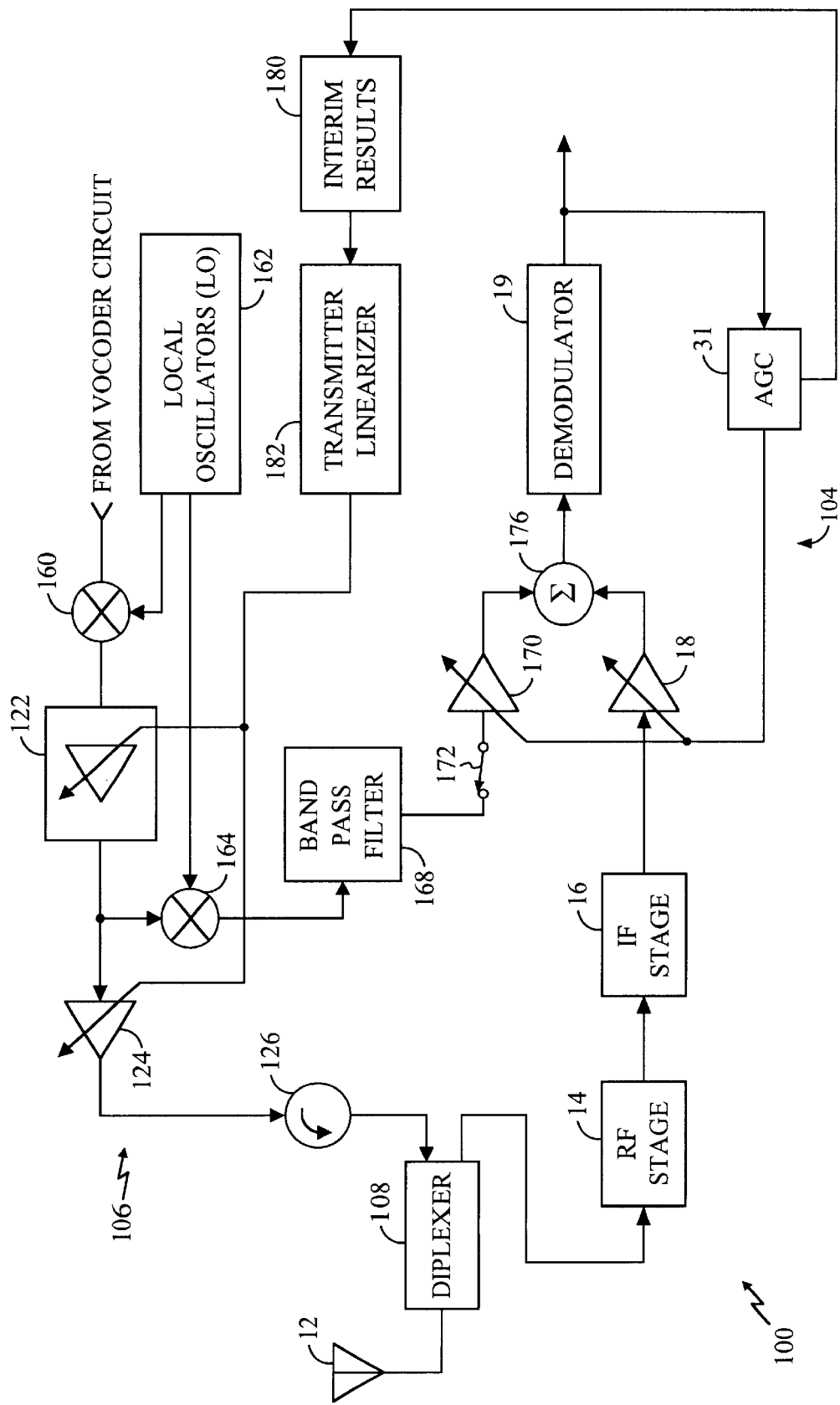
FIG. 7 is a functional block diagram of another exemplary embodiment of the presently disclosed subject matter.

Similarly, FIG. 7 illustrates additional components in the transmitter portion 106 that are not illustrated in the functional block diagram of FIG. 4. Specifically, FIG. 7 illustrates a mixer 160 and local oscillators 162 that modulate data, such as voice data from a vocoder circuit (not shown) to generate the desired radio frequencies. The output of the mixer 160 is coupled to the VGA 122 whose output is coupled, in turn, to the RF power amplifier 124. The output of the RF power amplifier 124 is coupled to the diplexer 108 via the isolator 126, as described above.

The system 100 of FIG. 7 includes a second mixer 164 coupled to the output of the variable gain amplifier 122 and the local oscillators 162. The mixer 164 shifts the frequency of the transmitted output signal to IF frequencies compatible with the receiver portion 104. A typical wireless communication device includes a single master oscillator from which the various local oscillator frequencies are derived. As is known in the art, the transmitter and receiver operate at different frequencies that are offset by a predetermined amount that is set by industry standards. For example, in a cellular telephone operation, the transmitter and receiver are offset by 45 MHz. The circuitry used to derive the local oscillator frequencies to produce the desired offset is known in the art and need not be described herein. The local oscillators 162 provide the necessary frequencies to the mixers 160 and 164, respectively. That is, the local oscillators 162 provide one frequency to the mixer 160 for the transmitter portion 106 and provide a second frequency to the mixer 164 to convert the transmitted signal to the receiver IF frequency.

The output of the mixer 164 is coupled through a band pass filter 168 to a VGA 170. The band pass filter 168 operates in a conventional manner as an IF filter. It should be noted that the output of the band pass filter 168 is coupled to the input of the VGA 170 via a switch 172, such as an electronic switch. The operation of the switch 172, which functions as a coupling circuit to couple the transmitter portion 106 to the receiver portion 104, will be described in greater detail below.

The output of the VGA 170 and the VGA 18 are combined by a summer 176. Using this configuration, the system 100 utilizes the calibration of the receiver portion 104 to calibrate the transmitter portion 106. The calibration of the receiver portion 104 is performed in a manner known in the art and described above. During the receiver calibration procedure, the switch 172 is deactivated so that no output from the band pass filter 168 is provided to the VGA 170. Following the calibration of the receiver portion 104, the switch 172 is activated such that the signal from the band pass filter 168 is now provided as an input to the VGA 170.

The transmitter portion 106 is calibrated during the manufacturing process in the following manner. Control signals set the gain of the VGA 122 at the predetermined transmit power level. The signal from the output of the VGA 122 is mixed with the local oscillator signal 162 by the mixer 164 to produce an output signal compatible with the frequencies of the receiver portion 104. The output of the mixer 164 is provided to the VGA 170 via the band pass filter 168 and the switch 172. The system 100 utilizes the previously calibrated receiver portion 104 to accurately determine the received signal level, which is proportional to the transmitted power level from the VGA 122. If the transmitted signal level is greater than or less than the desired transmitted power level, the error is detected by the calibrated receiver circuitry and the deviation is stored in the form of interim results 180. The interim results the process may be repeated for numerous transmitter gain steps and different transmitter frequencies. In addition, calibration processes may be performed for different power supply levels and different temperature settings to provide an accurate characterization of the transmitter portion 106.

The interim results 180 are used to generate a transmitter linearizer 182. The interium results 180 indicate an error difference between the desired transmit power level and the actual transmit power level. These interium data results are used to create the transmitter linearizer 182 and effectively determine the actual gain control curve for the VGA 122.

The transmitter linearizer 182 operates in a manner similar to that described above with respect to that described above with respect to the receiver linearizer 40. That is, the transmitter linearizer 182 breaks the variable gain curve for the VGA 122 into a plurality of piece-wise linear portions that describe the actual gain characteristics and provide sufficient gain resolution. Whenever the system 100 calls for a particular gain setting for the transmitter portion 102, the transmitter linearizer 182 is used to select the actual control voltage for the variable gain amplifier 122. It should be noted that the switch 172 is deactivated during normal operation of the wireless device. In the deactivated position, the switch 172 provides a desired degree of isolation between the receiver portion 104 and the transmitter portion 106.

Although the VGA 18 is calibrated when the receiver portion 104 is calibrated in a conventional manner, the VGA 170 is not calibrated. However, in an exemplary embodiment, the VGA 18 and the VGA 170 are formed on a common integrated circuit substrate and are thus closely matched. The separate VGA 170 and switch 172 provide the desired degree of isolation between the receiver portion 104 and the transmitter portion 106.

A variety of alternative architectures may be used by the system 100 illustrated in FIG. 7. For example, the mixer 164 can be designed to mix to the RF frequency of the receiver portion 104 to permit coupling of the transmitter signal at the RF stage 14 or at a point intermediate the RF stage and the IF stage. The presently disclosed subject matter is directed to a technique for using the calibrated receiver pathway to calibrate the transmitter and is not limited by the particular point in the receiver pathway at which the transmitter signal is injected. In an alternative embodiment, the switch 172 can be replaced by an SPDT switch 172, as illustrated in FIG. 8. The alternative architecture of FIG. 8 eliminates the need for the uncalibrated VGA 170 and the summer 176. The SPDT switch 172 in FIG. 8 must provide necessary degree of isolation between the receiver portion 104 and the transmitter portion 106. In the embodiment illustrated in FIG. 8, the SPDT switch 172 is coupled to the IF stage 16 during the calibration process for the receiver portion 104. The SPDT switch is coupled to the band pass filter 168 during the calibration of the transmitter portion 106. It should be noted that during normal operation of the wireless device, the SPDT switch 172 is coupled to the IF stage 16.

It is to be understood that even though various embodiments and advantages of the presently disclosed subject matter have been set forth in the foregoing description, the above disclosure is only illustrative of the claimed invention. Therefore, it should be understood that the invention of the present patent application is to be determined only by reference to the appended claims, which are supported by the above disclosed subject matter.

What is claimed is:

1. A system for the control of transmit power in wireless communication device having a transmitter and a receiver, the receiver having a calibrated receiver signal pathway capable of determining the strength of a received signal, the system comprising:

a variable gain radio frequency (RF) transmitter amplifier having an amplifier input and an amplifier output and a variable gain control input, the variable gain control input initially receiving a control signal indicative of a desired transmit power level;

a mixer coupled to the amplifier output and receiving an oscillator signal having an oscillator frequency corresponding to an operational frequency of the receiver, the mixer generating a signal at operational frequency of the receiver and corresponding to a signal at the amplifier output; and a coupling circuit to couple the signal generated by the mixer to the receiver signal pathway to permit power measurement of the signal using the calibrated receiver signal pathway, wherein the coupling circuit comprises a single-pole-single-throw (SPST) type switch to couple the signal generated by the mixer to the receiver signal pathway;

wherein the receiver comprises a first receiver variable gain amplifier in the receiver signal pathway, the system further comprising a second receiver variable gain amplifier having an input coupled to the SPST type switch and an output coupled to the receiver signal pathway to couple the signal generated by the mixer to the receiver signal pathway.

2. The system of claim 1 wherein the first and second receiver variable gain amplifiers are matched circuits implemented on a common integrated circuit.

3. The system of claim 1 wherein the first receiver variable gain amplifier has an output, the system further comprising a summer having first and second summer inputs and a summer output with the first and second receiver variable gain amplifier outputs being coupled to the first and second summer inputs, respectively, the summer output being a portion of the receiver signal pathway.

* * * * *